United States Patent

Kitamoto et al.

[11] Patent Number: 6,114,942
[45] Date of Patent: Sep. 5, 2000

[54] PTC DEVICE AND BATTERY PACK USING THE SAME

[75] Inventors: Yoshitaka Kitamoto, Yokohama; Takashi Hasunuma, Chiba; Shozo Fukuyama, Ibaragi; Naofumi Miyasaka, Chiba, all of Japan

[73] Assignee: KK Raychem, Yokohama, Japan

[21] Appl. No.: 09/011,549

[22] PCT Filed: Aug. 6, 1996

[86] PCT No.: PCT/JP96/02205

§ 371 Date: Apr. 9, 1998

§ 102(e) Date: Apr. 9, 1998

[87] PCT Pub. No.: WO97/06538

PCT Pub. Date: Feb. 20, 1997

[30] Foreign Application Priority Data

Aug. 7, 1995 [JP] Japan .................................. 7-200750

[51] Int. Cl.⁷ .................................................... H01C 7/10
[52] U.S. Cl. ........................ 338/22 R; 338/221; 429/7; 429/62; 429/65
[58] Field of Search ............................ 338/22 R, 225 D, 338/220, 221; 361/106; 429/7, 62, 65; 320/107, 112

[56] References Cited

U.S. PATENT DOCUMENTS

| | | | |
|---|---|---|---|
| 4,237,441 | 12/1980 | van Konynenburg et al. | 338/22 R |
| 4,255,698 | 3/1981 | Simon | 320/35 |
| 4,973,936 | 11/1990 | Dimpault-Darcy et al. | 338/32 R |
| 5,801,612 | 9/1998 | Chandler et al. | 338/22 R |
| 5,856,773 | 1/1999 | Chandler et al. | 338/22 R |

FOREIGN PATENT DOCUMENTS

| | | |
|---|---|---|
| 4-75287 | of 0000 | Japan . |
| 5-109505 | of 0000 | Japan . |
| 55-78406 | of 0000 | Japan . |
| 7-057721 | 3/1995 | Japan . |
| 7-065856 | 3/1995 | Japan . |

OTHER PUBLICATIONS

"Improved Thermal–Switch Disks Protect Batteries", *NASA Tech Brief*, pp. 24–25, May 1990.

U.S. Application No. 08/910,865 (Chandler et al.), filed Aug. 13, 1997 (priority date Aug. 24, 1995).

Patent Abstracts of Japan, vol. 095, No. 006, Jul. 31, 1995 and JP 07–065856(Toshiba Corporation), Mar. 10, 1995 (abstract only: patent listed above).

Patent Abstracts of Japan, vo. 095, vol. 095, No. 006, Jul. 31, 1995 and P 07–057721 (Matsushita Electric Ind. Co. Ltd), Mar. 3, 1995 (abstract only; patent listed above).

European search report, dated May 7, 1999, Application No. EP–96926002.5–2214–JP9602205.

*Primary Examiner*—Michael L. Gellner
*Assistant Examiner*—Karl Easthom
*Attorney, Agent, or Firm*—Marguerite E. Gerstner; Herbert G. Burkard

[57] ABSTRACT

A PTC device which surely achieve effective space utilization while easily excluding the possibility of the formation of a short circuit. The PTC device includes a PTC component 3 comprising a first electrode 11, a second electrode 13, and a PTC element 9 disposed between these electrodes, a first electrically conductive lead 15 which is connected to the first electrode and able to connect with a button terminal of a battery, a second electrically conductive lead 18 which is connected to the second electrode, and an insulating element 23. The insulating element covers the inner periphery 7 of the PTC component, the second electrode and a portion of the second electrode and the second electrically conductive lead on the second electrode.

16 Claims, 3 Drawing Sheets

PTC DEVICE AND BATTERY PACK USING THE SAME

BACKGROUND OF THE INVENTION

1. Field of the Invention

The present invention relates to a PTC device which can be used as a circuit protection device and a battery pack or assembly using such a device.

2. Introduction to the Invention

The use, as a circuit protection device, of a PTC (positive temperature coefficient of resistance) device comprising a PTC composition which has the "positive temperature coefficient of resistance" property so as to protect batteries and/or circuits from overcurrent conditions and overtemperature conditions therefrom is disclosed in, for example, U.S. Pat. Nos. 4,255,698 (Simon) and 4,973,936 (Dimpault-Darcy et al), and Japanese Utility Model Application No. 4-75287.

The PTC composition is one which gives a device comprising the composition (i.e. a PTC device) the following characteristics: the device is in a low resistance condition at a temperature during a normal operation (depending on circuit conditions in which the device is used, for example from room temperature to 40° C.); on exposure to a high temperature due to, for example, unusually large current resulting from the formation of a short circuit or excessive charging (depending on circuit conditions in which the device is used, for example from 60 to 130° C.), the device switches into an extremely high resistance condition. Thus, when such a device is included in a circuit and an abnormal current passes through the circuit, the device comes into the higher temperature condition and switches into the higher resistance condition so that it decreases the current passing through the circuit and thus protects electric elements forming the circuit, parts connected to batteries and so on.

Such a PTC composition is well known and no additional description is required. Detailed description can be seen in, for example, Japanese Patent Kokai Publication No. 55-78406. The disclosures of these documents are incorporated herein by reference.

Battery packs, in which a plurality of batteries are contained, are commonly used in electric or electronic equipment such as cameras, video cameras, tools, portable phones and portable computers. It is desirable to make such equipment as compact (i.e. lightweight and small) as possible from a viewpoint of its portability. Thus, the battery packs contained in the equipment are preferably compact.

Abnormal current may pass through a circuit in such equipment due to the occurrence of a failure such as the formation of a short circuit. When a PTC device is used for the protection of the circuit from failure, effective space occupation of the device within the equipment is required from a viewpoint of the compact equipment.

In order for the equipment to be compact, U.S. Pat. No. 4,973,936 discloses placing the PTC device directly onto a button terminal of a battery. In this PTC device, a PTC component is in the shape of a disk to which a ring shaped insulation element is bonded using an adhesive, and a central portion of the insulation element is a hole which can receive the button terminal of the battery. For such a PTC device, since the PTC component is located on the top of the button terminal of the battery, a space is required in the battery pack to accommodate the thickness of the PTC component and to prevent the formation of a short circuit between the electrodes of the PTC component. Thus, the battery pack is required to have a sufficient space along a longitudinal direction of the battery.

Japanese Utility Model Application No. 4-75287 discloses a PTC device as a circuit protection device which comprises an electrode having a cap-shaped portion which can receive a button terminal of a battery, a half-ring-shaped electrode, and a PTC element sandwiched between the electrodes. With such a PTC device, since a distance between a side of the cap shaped portion of the electrode and the half-ring-shaped electrode is small, the formation of a short circuit is possible between those electrodes. In order to prevent such formation, a positional relationship between the cap portion and the PTC element and between the cap portion and the other electrode should be precisely adjusted. Such adjustment leads to an increase of production cost of the PTC device.

SUMMARY OF THE INVENTION

As described above, the circuit protection devices which have been hitherto developed are not necessarily satisfactory, and they still have the problems exemplified above. Thus, further improved circuit protection devices are required. In particular, a circuit protection device satisfying both the following is required: first, because of the small size of the device itself, there is a need to overcome the very real possibility of short circuits between the device electrodes or the device failing to function as a device; second, the device should be equivalent in effective space utilization to devices proposed heretofore.

It is, therefore, an object of the present invention to provide a PTC device which can be used as a circuit protection device and which easily excludes potential formation of a short circuit while ensuring the effective space occupation, and also to provide a battery pack in which such a device is used.

In the first aspect, the present invention provides a PTC device which is suitable for attachment to a button terminal of a battery, said device comprising (A) a PTC component which (i) has an outer periphery and an inner periphery which defines a hole in the center of the PTC component, and (ii) comprises
  (1) a laminar PTC resistive element which is composed of a PTC electrically conductive polymer composition (which is also referred to as a "PTC element"),
  (2) a first laminar electrode which is attached to a first surface of the PTC resistive element (which is also referred to as a "first electrode"), and
  (3) a second laminar electrode which is attached to a second opposite surface of the PTC resistive element (which is also referred to as a "second electrode");

(B) a first electrically conductive lead which comprises
  (1) a first part which is attached to the first laminar electrode, and
  (2) a second part which at least partially closes the hole of the PTC component;

(C) a second electrically conductive lead which comprises
  (1) a first part which is attached to the second laminar electrode, and
  (2) a second part which extends away from the outer periphery of the PTC component; and (D) an insulating layer which covers the inner periphery of the PTC component and at least a portion of the first part of the second electrically conductive lead.

In the PTC device according to the present invention, the PTC component is defined by a first main surface formed by the first (laminar) electrode, a second main surface formed by the second (laminar) electrode, the outer periphery and the inner periphery.

Thus, the PTC device according to the first aspect of the present invention can also be regarded as a PTC device comprising a PTC component, a first electrically conductive lead and a second electrically conductive lead, which device is characterized in that (A) the PTC component comprises a PTC element, a first electrode and a second electrode in which
   (1) the PTC component (a) has a through hole which is located in its center and (b) is defined by an inner periphery and an outer periphery, and a first main surface and a second main surface which are opposed to each other,
   (2) the first main surface is formed by the first electrode, and the second main surface is formed by the second electrode, and
   (3) a PTC element comprises a PTC electrically conductive polymer, and is located between the first electrode and the second electrode,
(B) the first electrically conductive lead comprises a first part and a second part in which
   (1) the first part is connected to the first electrode, and
   (2) the second part extends across an opening of the through hole so that it at least partly closes the opening, and is able to electrically connect with a button terminal of a plus electrode of a battery,
(C) the second electrically conductive lead comprises a first part and a second part in which
   (1) the first part is connected to the second electrode, and
   (2) the second part extends away from the PTC component, and is able to electrically connect with another electrical component, and
(D) an insulating element covers the inner periphery of the PTC component and at least a portion of the first part of the second electrically conductive lead.

In a second aspect, the present invention further provides a battery pack (or assembly) comprising the above PTC device and a battery in which the PTC device is placed on a button terminal side of the battery so that the terminal is connected to the second part of the first electrically conductive lead.

Figure 1:
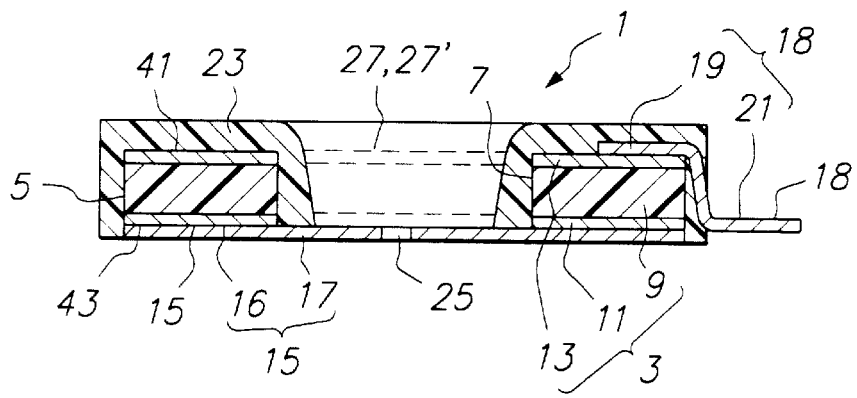
FIG. 1 is a schematic cross-sectional view of the PTC device according to the present invention.

In the above drawings, the reference numbers indicate as follows:

1,1' PTC device
3 PTC component
5 outer periphery
7 inner periphery
9 PTC element
11 first electrode
13 second electrode
15 first conductive lead
16 first part of first conductive lead
17 second part of first conductive lead
18 second conductive lead
19 first part of second conductive lead
21,21' second part of second conductive lead
23 insulating element
25 hole in first conductive lead
27,27' hole in PTC component
28 battery assembly
29 battery
31 button terminal
33 battery
35 button terminal
41 second mail surface
43 first main surface
45,47 minus electrode
51,53 locating tab
61 unified component
65 inner periphery of unified component
67 raised rim of insulating element 23

DETAILED DESCRIPTION OF THE INVENTION

In the present invention, the "button terminal" substantially means a "protruding part of a plus side electrode of a battery." For example, the plus side electrode of the battery means an electrode on a plus side of a commercially available dry battery, and a plus terminal of that battery is a terminal of the plus side electrode, and usually a protruding part of the plus side electrode. "The second part of the second conductive lead extends away from the PTC component" means that the second part extends outwardly from the side (or edge) of the outer periphery of the PTC component (i.e. extends away from the PTC component). Further, "electrically connect" means to make a connection so that current can flow through the connection.

In the present invention, the insulating element covers the inner periphery of the PTC component so that the formation of a short circuit between the button terminal of the battery and the PTC element forming the inner periphery of the PTC component is prevented. Optionally, when the second electrode forms a portion of the inner periphery of the PTC component (in other words, for example, when the second electrode is so located on the PTC element that an inner edge of the second electrode forms an upper portion of the inner periphery, as shown in FIG. 1), the insulating element prevents the formation of short circuits between the button terminal and the second electrode and between the first electrode and the second electrode.

In a preferred embodiment, the insulating element covers at least a portion of an area of the second main surface on which area no second conductive lead is placed, so that the second main surface is at least partially covered with the insulating element. Therefore, when the button terminal of the battery is located within the through hole and electrically connected to the first electrode, it is ensured that no other part of the plus electrode of the battery than the button terminal electrically contacts the second main surface, whereby the short circuit formation is prevented between the plus electrode and the second main surface. That is, the partial covering of the insulating element functions as a spacer which spatially separates the plus electrode of the battery away from the second main surface by a certain distance.

In addition, the insulating element preferably covers the first part of the second conductive lead, so that no short circuit is formed between the plus terminal of the battery and the first part of the second conductive lead. With respect to the relationship between the button terminal of the battery and the first part of the second conductive lead, even if the first part of the second conductive lead is located just adjacent to the inner periphery of the PTC component with an edge of the first part facing the button terminal (namely, the edge of the first part extends up to the inner periphery), no electrical contact is formed between the button terminal and the first part because the covering of the insulating element on the inner periphery functions as a spacer.

In one preferred embodiment of the PTC device according to the present invention, at least a portion of the area of the second main surface which area has no second conductive lead thereon but has the covering of the insulating element is a portion of the second main surface which portion is adjacent to the inner periphery of the PTC component and more preferably a portion of the second main surface which is adjacent to a whole of the inner periphery, (thus the portion is in a ring form), and the first part of the second conductive lead is adjacent or close to the outer periphery of the PTC component. Being "adjacent" means that the insulated second main surface or the first part of the second conductive lead is in contact with the inner periphery or the outer periphery. Being "close" means that the first part of the second conductive lead is not in contact with the outer periphery, but extends to the vicinity of the outer periphery. In such an embodiment, since the insulating element covers both an inner area and an outer area of the second main surface, the contact between the second main surface and the plus terminal of the battery is more surely prevented.

In another preferred embodiment according to the present invention, at least a portion of the area of the second main surface on which area no second conductive lead is located but the insulating element is placed is a whole of the area of the second main surface on which the second conductive lead is not located. Thereby, electrical contact is completely prevented between the second main surface and the plus terminal of the battery.

In a further preferred embodiment, the insulating element further covers the outer periphery of the PTC component. Thereby, electrical contact is prevented between the second part of the second conductive lead and the PTC component.

In another embodiment of the PTC component of the present invention, the insulating element covers at least a portion of the second conductive lead so that the insulating element and the second conductive lead form a single component. The use of such a single component makes assembling of the device easier because the number of parts to be assembled is reduced. In this embodiment, the first part of the second conductive lead may have a geometry which is substantially the same as that of the PTC component The first part of the second conductive lead may completely cover the second electrode. Alternatively, the first part of the second conductive lead may be slightly smaller than the second electrode or may be covered in part by the insulating element, so that a portion of the second electrode is in contact with the insulating element. In this embodiment, the insulating element preferably covers substantially all the surface of the first part of the second lead which is not in contact with the second electrode.

In addition, the insulating element can cover a side of the first part of the second conductive lead so as to create a rim (protrusion) at an inner periphery of the first part of the second conductive lead which contacts and insulates the inner periphery of the PTC component. The thickness (or height) of the rim is preferably the same as that of the PTC component, so that when the PTC component and the single component including the second conductive lead are attached to each other, the thickness of a total of the insulating component, the first part of the second conductive lead and the PTC component is constant in any cross section of the PTC device (see FIG. 10).

An additional advantage of the use of the single component in which the insulating element and the second conductive lead are unified is that critical areas of the PTC component, e.g. the inner periphery, are insulated, but the PTC component is not necessarily required to be completely covered by the insulating element. For example, the outer periphery of the PTC component need not be covered with insulating element. This means that upon the actuation of the PTC device, the PTC component can expand more freely than when the outer periphery is completely covered by insulating element.

In another preferred embodiment, for example, for the purpose of assembling the battery pack, the PTC device of the present invention has such a size that it does not extend radially beyond the periphery of the plus electrode of the battery when it is placed on the battery, as described below.

The PTC devices according to the present invention as described above can be used as a circuit protection device in various electrical circuits and battery packs.

In the second aspect, the present invention provides a battery pack (or assembly) comprising the PTC device described as above and a battery. In such a battery pack, the button terminal is placed within the through hole of the PTC device while the terminal electrically connects with the second part of the first conductive lead.

The battery pack of the present invention may have one or more batteries. If the battery pack has a plurality of batteries, they can be connected in series or in parallel. In these cases, the electrical connection between the batteries is achieved by the PTC device of the present invention, and the connection between the minus electrode of the battery and the PTC device is achieved by the second part of the second conductive lead. In another way, the second part of the second conductive lead may electrically connect with another electrical component constituting a circuit instead of the minus electrode of the battery.

According to the present invention, since the insulating element surrounds the button terminal of the battery, it prevents electrical contact of the button terminal with the second electrode and the PTC element. It also prevents electrical contact between the second main surface of the PTC component and the button terminal and between the second conductive lead and the button terminal, so that no short circuit is formed. Also, since the hole of the PTC device receives the button terminal, the space formed by the protruding button terminal can be effectively used. Thus, when the PTC device of this invention is used for the production of the battery pack, it can minimize the size of the battery pack.

The present invention will be explained in detail by preferred embodiments of the circuit protection device (PTC device) according to the present invention with reference to the accompanied drawings of FIGS. 1 to 10.

FIG. 1 shows a schematic cross-sectional view of one embodiment of the preferred PTC devices according to the present invention in which the PTC 1 device comprises the PTC component 3, the first conductive lead 15 and the second conductive lead 18, and the insulating element 23. In the illustrated embodiment, the insulating component 23 covers the inner periphery 7, the first part of the second conductive lead 19, the outer periphery 5 and the whole of the second main surface except an area on which the second conductive lead 18 is placed. The PTC component 3 comprises the first electrode 11 and the second electrode 13 and the PTC element 9 sandwiched by these electrodes. In the illustrated embodiment, the two electrodes form the first main surface 43 and the second main surface 41 of the PTC component 3 which are opposed to each other.

Figure 2:
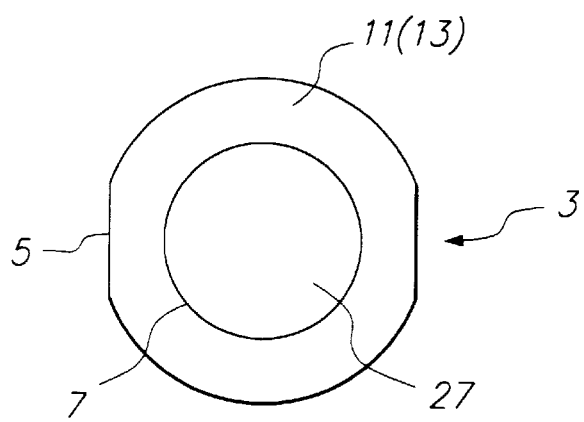
FIG. 2 is a schematic plan view of the PTC component which is used for the PTC device according to the present invention.

FIG. 2 shows a schematic plan view (as viewing the embodiment shown in FIG. 1 from its top or bottom) of only the PTC component 3 which constitutes the PTC device 1 according to the present invention. As seen from FIGS. 1 and 2, the PTC component 3 is defined by the main surfaces 41 and 43, the outer periphery 5 and the inner periphery 7. It is in the form of a disk having a through hole 27 in its center (thus, it is in the form of a flattened ring shape as a whole of the component). The inner periphery 7 defines the hole 27. The disk here does not necessarily means a circle shape. As shown, a cross section of the outer periphery 5 may not be a circle shape, and it may be, for example, of a rectangular or a polygon, or it may be of a suitable combination of a circle, a rectangular and a polygon. The same is applied to a cross section of the inner periphery 7. However, in one preferred embodiment, at least the inner periphery 7 has the cross section of a circle.

What is important is that the PTC device has such a structure after being insulated by the insulating element that it can be easily positioned onto the button terminal side of the battery and does not extends outwardly beyond the transverse cross section of the battery except for the second part of the second conductive lead. It is also important that the hole 27 can receive the button terminal after the covering of the insulating element has been applied. As long as this is satisfied, the PTC device 3 may be of any shape. For example, the PTC component 3 is not necessarily in the closed ring form and may be of the open ring form (namely, a ring form having a radial slit).

In the PTC component 3, the PTC element 9 to which the first electrode 11 and the second electrode 13 are attached is made of an electrically conductive polymer composition. The PTC component 3 is preferably made from a laminate of the PTC conductive polymer composition element which is sandwiched between two metal foils as the electrodes.

The conductive polymer composition which can be used is well known for those skilled in the art. Concretely, compositions described in the patent publications which are referred to in the Introduction to the Invention section can be used, and such a composition comprises a polymer material and an electrically conductive filler, for example, in the form of a particulate, which is dispersed in the polymer material. The polymer material preferably is an organic crystalline polymer, for example, a polyolefin such as a polyethylene or an ethylene copolymer; a fluoropolymer, such as a polyvinylidene fluoride; or a blend of two or more of these polymers. The particulate conductive filler is preferably carbon black, graphite, metal, metal oxide, glass coated with an electrically conductive material, or a blend of these fillers. The conductive polymer composition may contain other additives, e.g. an antioxidant, an inert agent, or a stabilizer, and may be crosslinked by a suitable manner (such as irradiation).

With respect to the resistivity of the conductive polymer composition, the resistivities during the normal operation and the unusual operation of the equipment in which the PTC device is used can be set as desired by properly adjusting the kind and the amount of the conductive filler to be used and the kind and the amount of the polymer material to be used depending on the equipment. For most applications, the conductive polymer composition has, at a temperature of 20° C., a resistivity of generally not more than 10 ohm-cm, preferably not more than 5 ohm-cm, and more preferably not more than 2 ohm-cm, and for example, a lower resistivity such as not more than 1 ohm-cm is better.

The PTC element 9 is formed by a suitable manner, for example extruding the conductive polymer composition followed by cutting it, and attaching the electrodes to have a sheet form. Both the first electrodes 11 and the second electrodes 13 comprise an electrically conductive material, and are preferably metal in the form of a foil or a thin sheet, which form is effective to reduce the volume of the device. As the metal, for example, nickel, copper, or iron or an alloy such as brass or stainless steel may be preferably used.

In place of or in addition to the metal foil, either or both of the electrodes may comprise a conductive paint or a graphite layer. It is particularly preferred that, when metal foils are used for the electrodes, they comprise an electrolyzed metal foil, which achieves good adhesion between the PTC element and the electrodes. The attachment between the electrodes and the PTC element of the conductive polymer composition may be achieved by any suitable manner, for example, by using an electrically conductive adhesive, by applying the electrodes to the polymer composition when it melts or by pressure application.

In the PTC device 1 according to the present invention, the first electrode 11 of the PTC component 3 is electrically connected to the first conductive lead (or lead terminal) 15, and the second electrode 13 is electrically connected to the second conductive lead (or lead terminal) 18. The connections may be made by any suitable manner, for example, by means of soldering, welding, or using an electrically conductive adhesive. In one preferred embodiment, merely pressing an appropriate electrode plate onto the conductive lead terminal is sufficient.

Figure 3:
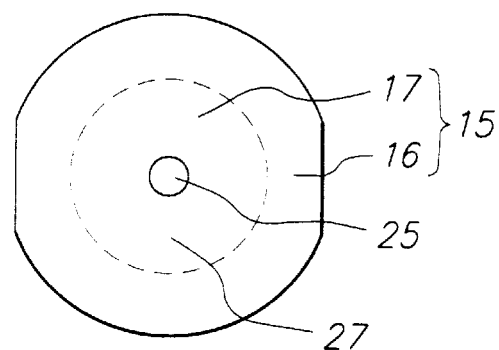
FIG. 3 is a schematic plan view of the PTC component including the first conductive lead, which component is used for the PTC device according to the present invention.

FIG. 3 schematically shows, as viewed from the bottom in FIG. 1, the PTC component 3 in which the first conductive lead 15 has been attached. The first conductive lead 15 comprises a first part of the first conductive lead 16 which is attached to the first electrode 11 and a second part of the first conductive lead 17 which is located below the hole 27 of the PTC component 3. The first part 16 covers at least a portion of and preferably substantially the whole (as shown in FIG. 3) of the surface of the first electrode 11. A portion of the second part 17 (PTC component 3 side) of the first conductive lead 15 is able to be directly connected electrically to the button terminal of the battery by means of a suitable manner, for example, soldering, applying a pressure or welding.

The second part 17 covers at least a portion of the opening of the hole 27 of the PTC component 3. Optionally, the second part 17 may have one or more openings 25. As seen from the comparison between FIGS. 2 and 3, the shape of the outer periphery of the first conductive lead 15 may be substantially the same as that of the PTC component 3.

Figure 4:
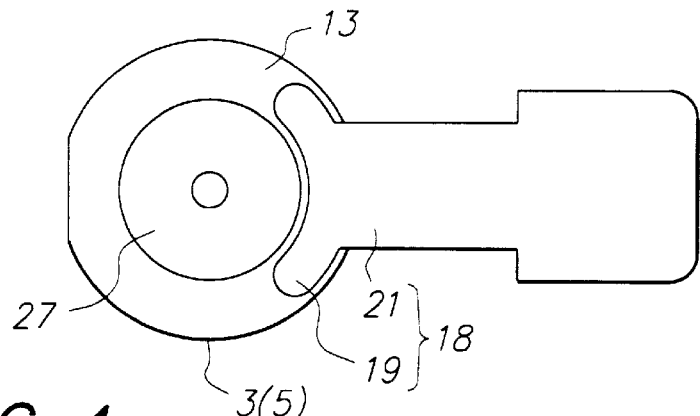
FIG. 4 is a schematic plan view of the PTC component including the second conductive lead, which component is used for the PTC device according to the present invention.

FIG. 4 shows, in a schematic plan view as viewed from the top in FIG. 1, the PTC component 3 to which the second conductive lead (or lead terminal) 18 has been attached. The second conductive lead 18 comprises a first part of the second conductive lead 19 and a second part of the second conductive lead 21. The first part 19 is apart which is attached to at least a portion of the second electrode 13. The first part 19 may be attached to cover the whole of the second electrode 13, but it is usually sufficient that the first part 19 partly covers the second electrode 13 as shown for easily manufacturing the device. One preferred shape of the first part 19 may be a part of the flat ring shape as shown (i.e. an arc shape) or a "U" shape.

The second part 21 of the second conductive lead 18 comprises a part which extends away from outer periphery 5 of the PTC component. The second part 21 functions to make electrical contact with another battery or other electric part, and it may be bent as shown in FIG. 1, if necessary.

The first and second conductive leads 15 and 18 can be made from any suitable material such as a metal or an alloy (e.g. nickel, stainless steel, copper, iron, brass or bronze). For the second conductive lead 18, a lead frame may be used in the production process.

Figure 5:
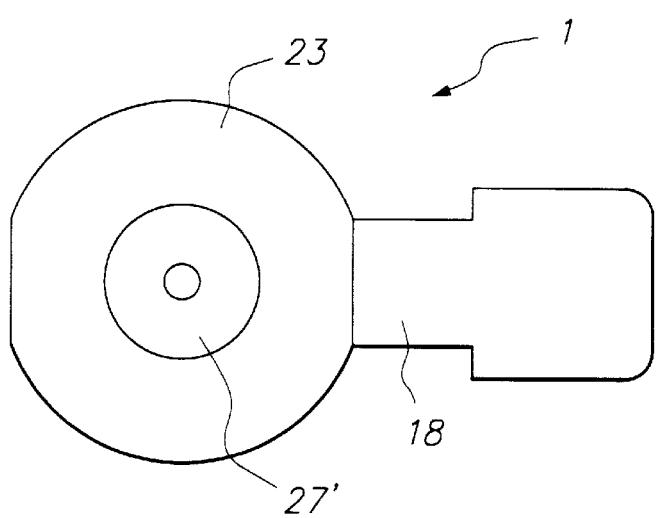
FIG. 5 is a schematic plan view of the PTC device according to the invention.

FIG. 5 schematically shows a plan view of the PTC device 1 as viewing the device from the top in FIG. 1; namely, shows a condition in which the insulating element 23 has been applied to the embodiment shown in FIG. 4. In the PTC device 1 according to the present invention, the insulating element 23 covers the inner periphery 7 of the PTC component 3, at least a portion of an exposed area (i.e. an area which is not covered with the second conductive lead) of the second electrode 13, and the first part 19 of the second conductive lead 18. With such an arrangement of the insulating element, when the button terminal of the plus electrode of the battery is placed within the hole 27', no electrical contact is formed between the plus electrode and both the second main surface and the first part of the second conductive lead, and also between the button terminal and the PTC component so that no short circuit is formed between them.

In a preferred embodiment, as shown in the figures, the insulating element 23 covers the inner periphery 7 of the PTC component 3, substantially the whole of the exposed area of the second electrode 13 and substantially the whole of the first part 19 of the second conductive lead 18. In addition to the preferred embodiment, it is more preferable that the insulating element covers at least a portion of the second part 18 adjacent to the first part 19. Further, in another embodiment, the insulating element 23 may completely cover the outer periphery 5 in addition to the more preferred embodiment, so that the PTC element 9 on the first conductive lead is prevented from being contact with the second part 21 of the second conductive lead 18. With this arrangement, the formation of the short circuit between the button terminal of the battery and the second electrode is prevented.

The thickness of the insulating element 23 is sufficient to ensure that the insulating element 23 resists abrasion which is experienced during the usual use of the device, and especially to ensure that there is formed no short circuit between the button terminal of the battery and the PTC component 9 or the second electrode, but is thin enough to minimize the space required when the device is positioned on the button terminal. The dimensions of the PTC device as a whole are determined so as to ensure installation of the device onto the button terminal of the battery.

The insulating element 23 preferably comprises an insulating material. As such a material, a polymer such as a polyamide, a polybutylene terephthalate (PBT), a polyester, a polyethylene, a polyvinylidene fluoride, or an epoxy resin may be used. When the insulating material is a thermoplastic material, it has a melting point which is higher than a melting point $T_m$ of the conductive polymer composition (thus, a melting point of the polymer which constitutes the composition) so as to ensure that substantial deformation of the insulating element is avoided when the PTC device is actuated and its temperature is raised.

Generally, it is preferred that the insulating element softens at a temperature greater than 130° C. in order to provide rigidity during its normal use. In addition, it is desired that the coefficient of thermal expansion of the insulating component is not so different from that of the conductive polymer composition. Preferably, those coefficients are substantially the same.

The insulating element can be applied to the PTC component 3 in the condition as shown in FIG. 4 by any suitable means, e.g. injection molding, spray coating, or dipping. In another embodiment, a molded article of the insulating element is formed beforehand by extrusion and then the article is applied to the PTC component 3 in the embodiment as shown in FIG. 4 by any suitable manner (e.g. using an adhesive or fusing). Optionally, an additional step may be carried out, for example, a curing step of the polymer material by heat, irradiation or ultraviolet light as required. Those forming methods have advantages that they are readily carried out, the insulating element is easily arranged and they are cost-effective. It is also preferred to use a method, for example, injection molding, which has little thermal effect on the conductive polymer composition of the PTC element.

The PTC device 1 according to the present invention is made by for example the following process: the PTC component 3 in the form of a ring is stamped out from a laminate comprising the conductive polymer composition 9 which is sandwiched between the two metal foils (11 and 13); then the first and second conductive leads (15 and 18) are attached to the PTC component, in a preferred embodiment, by applying solder paste between the first part 16 of the first conductive lead 15 and the first electrode 11, and also between the first part 19 of the second conductive lead and the second electrode 13 and reflowing the solder paste by means of hot air or in an oven followed by re-solidifying the paste; and finally the insulating element 23 is applied by means of injection molding. A diameter of the hole 27' which is formed after the insulating element 23 is applied is smaller than that of the original hole 27, and it is such that the button terminal of the battery is received within the hole 27' and the terminal is in contact with the second part of the first conductive lead 15 (see FIG. 6).

The resistance of the PTC device may be adjusted depending on its intended application, i.e. equipment in which the device is used. The resistance at 20° C. is generally not more than 1 ohm, preferably not more than 0.5 ohms, and more preferably not more than 0.25 ohms, e.g. 0.050 to 0.15 ohms.

Figure 6:
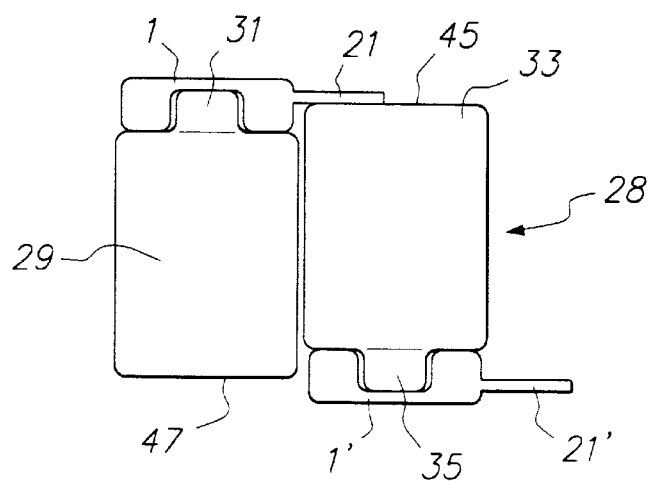
FIG. 6 is a schematic view of the battery pack in which the PTC device according to the invention is used.

The PTC device 1 of the invention is particularly suitable for the use in a battery pack or assembly 28 as schematically shown in FIG. 6. The battery pack 28 comprises the batteries 29 and 33 which comprise button terminals 31 and 35 respectively, and the PTC circuit protection devices 1 and 1' according to the present invention.

The PTC device 1 is so positioned that the hole 27' receives the plus terminal 31 to make electrical contact between the second part 17 of the first conductive lead 15 and the button terminal 31, and that the second part, and preferably the end of the second conductive lead 18, is connected to the minus terminal 45 of the adjacent battery 33. In another PTC device 1' of this invention, the second conductive lead 21' can be attached to a minus terminal surface of a battery (not shown) or other electrical part of the circuit (not shown). The minus terminal 47 of the battery 29 may be connected to an electrical component in a circuit.

As seen from FIGS. 1 and 6, when the circuit protection device according to the present invention is used, the space in the battery pack may be most effectively used. That is, the PTC device 1 only slightly extends the length of the battery pack along a height direction of the button terminal of the battery by the thickness of the first conductive lead 15. It is to be noted that the drawing in any Figure is shown exaggeratedly (especially in the thickness direction) for the ease of understanding. (Particularly, in FIG. 6, although it appears that the length along the longitudinal (or height) direction of the battery is considerably enlarged, the distance between an outermost surface of the lead terminal 15 of the PTC device and the end surface of the plus terminal 31 is substantially equivalent to the thickness of the lead terminal 15.)

The battery 29 to which the present device is applied may be any type of the battery, either a primary battery or a secondary battery, and for example a nickel-cadmium, nickel-hydrogen, alkaline, or lithium battery may be used. Particularly, it is preferred to use the device with a "AAA" type battery.

Figure 7:
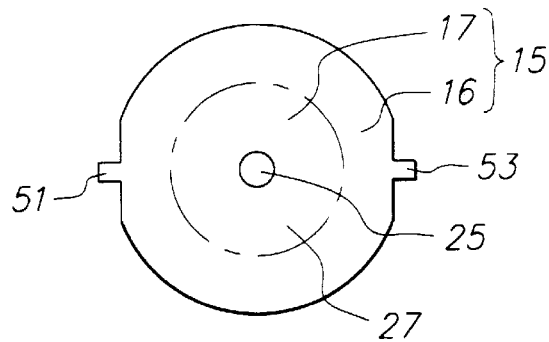
FIG. 7 is a schematic plan view, as shown in FIG. 3, of another embodiment of the first conductive lead which is suitably used for the PTC device according to the present invention.

FIG. 7 illustrates another embodiment of the first lead which is suitable for use in the PTC device of the present invention in a schematic plan view as in FIG. 3. In this embodiment, one or more locating tabs 51 and 53 (two tabs in the illustrated embodiment) are provided at the outer periphery of the first conductive lead 15 to allow for precise and efficient assembly, for example, when automatic assembling equipment is used. Similar locating tab(s) may be provided on the second conductive lead.

Figure 8:
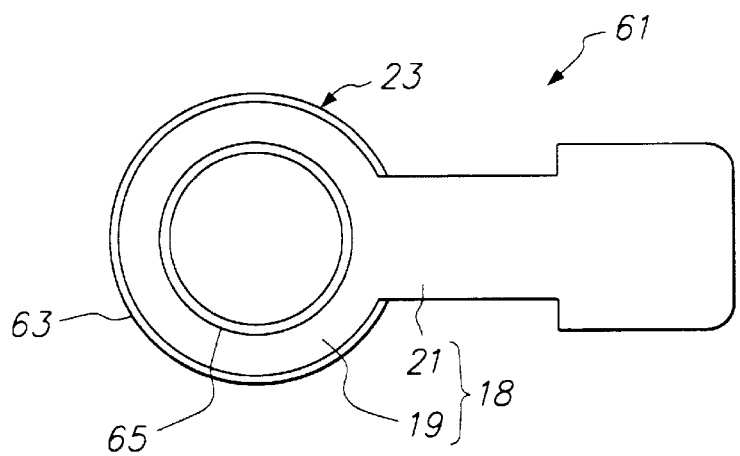
FIG. 8 is a schematic plan view (as viewed from the top of FIG. 1) of a single component in which the second conductive lead and the insulating element are made unified.
Figure 9:
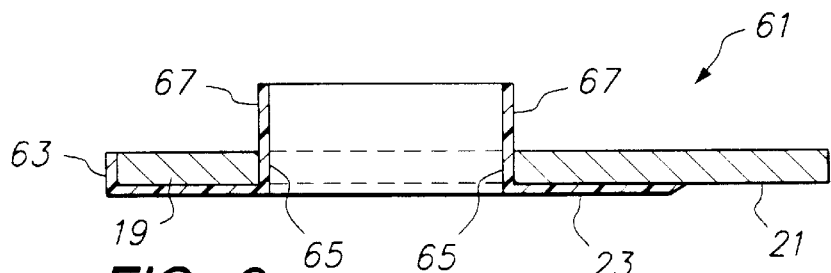
FIG. 9 is a schematic cross-sectional view (as viewed along a direction perpendicular to the plan view of FIG. 8) of a single component in which the second conductive lead and the insulating element are made unified.

FIGS. 8 and 9 show, in a plan view (namely, as viewed from the bottom in FIG. 1), a single component 61 in which the second conductive lead 18 and the insulating element 23 are formed integrally. In this embodiment, the first part 19 of the second conductive lead is in the form of a disk 19 which has the second part 21 extending away from the first part. Insulating element 23 comprises an outer periphery 63 and an inner periphery 65, and covers substantially all of one surface of the first part 19. The inner periphery 65 has a raised rim 67 of the insulating element which is designed to completely contact the inner periphery 7 of the PTC component 3.

Figure 10:
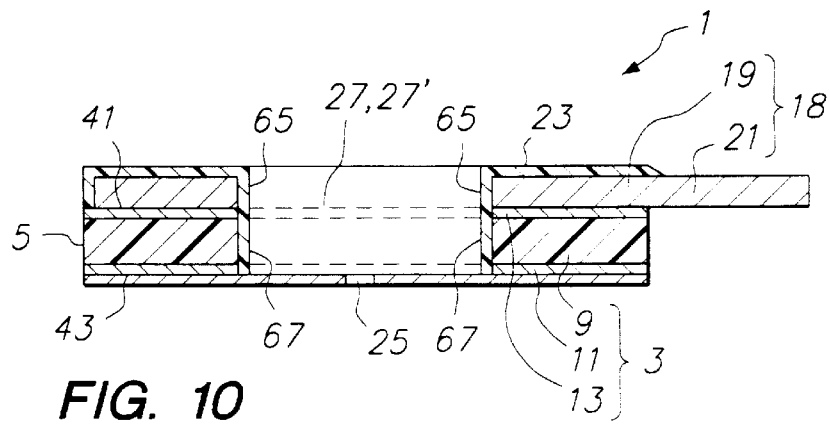
FIG. 10 is, similarly to FIG. 1, a schematic cross-sectional view of another embodiment of the PTC device according to the invention wherein the insulating element and the second conductive lead form a single component as in FIG. 8 or 9.

FIG. 10 shows in cross-section the PTC device 1 in which the single component and insulating component and the second conductive lead are formed into the single component 61 as shown in FIG. 8 or 9.

As seen from the above, the present invention provides a PTC device which will not suffer from the formation of short circuits by preventing direct contact between the button terminal of the battery and, for example the PTC element, the second conductive lead and the second electrode of the PTC component by means of the insulating element. Since the PTC device of the present invention can most effectively use the space around the button terminal of the battery when the device is used for the battery pack, the battery pack is not substantially enlarged in size.

The PTC device of the present invention is not disassembled during shipment or an assembly process of the battery pack when the insulating element is made unified with the PTC device. In addition, the assembling process of the battery pack can be simple, and for example precise location of the PTC device is easily carried out through the insulating element when the PTC device is placed onto the battery, which makes the process not complicated.

What is claimed is:

1. A PTC device suitable for attachment to a button terminal of a battery, said device comprising
   (A) a PTC component which (i) has an outer periphery and an inner periphery which defines a hole in the center of the PTC component, and (ii) comprises
      (1) a laminar PTC resistive element which is composed of a PTC electrically conductive polymer composition,
      (2) a first laminar electrode which is attached to a first surface of the PTC resistive element, and
      (3) a second laminar electrode which is attached to a second opposite surface of the PTC resistive element;
   (B) a first electrically conductive lead which comprises
      (1) a first part which is attached to the first laminar electrode, and
      (2) a second part which at least partially closes the hole of the PTC component;
   (C) a second electrically conductive lead which comprises
      (1) a first part which is attached to the second laminar electrode, and
      (2) a second part which extends away from the outer periphery of the PTC component; and
   (D) an insulating layer which covers the inner periphery of the PTC component and at least a portion of the first part of the second electrically conductive lead.

2. The device according to claim 1 wherein the insulating element covers at least a portion of the second laminar electrode.

3. The device according to claim 2 wherein the insulating element covers the inner and outer peripheries and the whole of the second laminar electrode.

4. The device according to claim 2 wherein the insulating element and the second electrically conductive lead form a single component.

5. The device according to claim 1 wherein the insulating element covers the inner and outer peripheries and the whole of the second laminar electrode.

6. The device according to claim 1 wherein at least the first electrically conductive lead comprises at least one locating tab.

7. The device according to claim 1 wherein the first and second electrically conductive leads comprise nickel, stainless steel, copper, iron or an alloy.

8. The device according to claim 1 wherein the insulating element and the second electrically conductive lead form a single component.

9. The device according to claim 1 wherein the insulating element is a polymer which is made of a polyamide, a polyester, a polybutylene terephthalate, a polyethylene, a polyvinylidene fluoride, or an epoxy resin.

10. A battery assembly which comprises
(A) a battery which comprises a button terminal; and
(B) a PTC device which comprises
  (1) a PTC component which (i) has an outer periphery and an inner periphery which defines a hole in the center of the PTC component, and (ii) comprises
    (a) a laminar PTC resistive element which is composed of a PTC electrically conductive polymer composition,
    (b) a first laminar electrode which is attached to a first surface of the PTC resistive element, and
    (c) a second laminar electrode which is attached to a second opposite surface of the PTC resistive element;
  (2) a first electrically conductive lead which comprises
    (a) a first tart which is attached to the first laminar electrode, and
    (b) a second part which at least partially closes the hole of the PTC component;
  (3) a second electrically conductive lead which comprises
    (a) a first part which is attached to the second laminar electrode, and
    (b) a second part which extends away from the outer periphery of the PTC component; and
  (4) an insulating layer which covers the inner periphery of the PTC component and at least a portion of the first part of the second electrically conductive lead, and which is placed over the button terminal so that the second part of the first electrically conductive lead is in physical and electrical contact with the button terminal.

11. The assembly according to claim 10 wherein the battery is a nickel-cadmium battery, a nickel-hydrogen battery or a lithium battery.

12. The assembly according to claim 11 which comprises at least two batteries and wherein the second part of the second electrically conductive lead extends from one battery to another battery to electrically connect between the batteries.

13. The assembly according to claim 10 which comprises at least two batteries and wherein the second part of the second electrically conductive lead extends from one battery to another battery to electrically connect between the batteries.

14. The assembly according to claim 10 wherein the battery is a AAA battery.

15. The device according to claim 1 wherein the insulating polymer softens at a temperature higher than 130° C.

16. The device according to claim 1 wherein the electrically conductive polymer composition has a melting point $T_m$ and the insulating polymer is a thermoplastic material which has a melting point higher than $T_m$.

* * * * *